United States Patent [19]

Nakatsuru et al.

[11] Patent Number: 4,972,340
[45] Date of Patent: Nov. 20, 1990

[54] ENGINE CONTROL SYSTEM

[75] Inventors: Kunito Nakatsuru; Masaaki Fujisawa, both of Katsuta; Taiji Hasegawa, Nakaminato, all of Japan

[73] Assignee: Hitachi, Ltd., Tokyo, Japan

[21] Appl. No.: 881,408

[22] Filed: Jul. 2, 1986

[30] Foreign Application Priority Data

Jul. 10, 1985 [JP] Japan .................................. 60-150235

[51] Int. Cl.[5] ...................... G06F 15/20; F02D 45/00
[52] U.S. Cl. ........................... 364/431.12; 364/431.04; 123/480; 123/417
[58] Field of Search .................... 364/431.03, 431.05, 364/431.07, 431.10, 431.12, 431.04; 123/339, 417, 489, 492, 480

[56] References Cited

U.S. PATENT DOCUMENTS

| | | | |
|---|---|---|---|
| 4,130,095 | 12/1978 | Bowler et al. | 123/440 |
| 4,181,944 | 1/1980 | Yamauchi et al. | 364/431.06 |
| 4,348,729 | 9/1982 | Sasayama et al. | 364/431.12 |
| 4,365,601 | 12/1982 | Yamazoe et al. | 123/339 |
| 4,366,541 | 12/1982 | Mouri et al. | 364/431.12 |
| 4,386,591 | 6/1983 | Nagase et al. | 123/339 |
| 4,455,978 | 6/1984 | Atago et al. | 123/339 |
| 4,484,552 | 11/1984 | Kobayashi et al. | 123/339 |
| 4,703,430 | 10/1987 | Amano et al. | 123/480 |
| 4,730,256 | 3/1988 | Niimi et al. | 364/431.12 |

*Primary Examiner*—Parshotam S. Lall
*Assistant Examiner*—V. N. Trans
*Attorney, Agent, or Firm*—Antonelli, Terry, Stout & Kraus

[57] ABSTRACT

An engine control system has a CPU (central processing unit), a ROM (read-only memory) and a RAM (random-access memory) backed up by a power supply. Only in the case where the difference between the data in the RAM and that in the ROM is within a predetermined range will the engine control inputs be regulated by use of the data in the RAM.

5 Claims, 4 Drawing Sheets

4,972,340

ENGINE CONTROL SYSTE

BACKGROUND OF THE INVENTION

The present invention relates to an engine control system, or more in particular to a system for controlling the engine optimally by a correction factor.

An engine control system is well known in which a correction factor is stored, and control values are corrected in an optimal manner by the correction factor. In this method, the control accuracy is improved by correctly determining the correction factor. In a conventional system, the correction factor is held in a RAM of a digital computer to which a voltage is continuously applied in a manner not to lose the data stored therein. An example of such a conventional system is disclosed in Japanese Patent Publication Laid-Open No. 112/79 (JP-A-54-112). The disadvantage of this conventional system, however, is that, as the correction factors are updated, the correction factor may be rewritten into an abnormal value by such adverse phenomenon as runaway of the digital computer, a drop in the battery output voltage at the time of start or noise. As a result, the controllability is deteriorated, thereby rendering the control faulty.

SUMMARY OF THE INVENTION

The object of the present invention is to provide a control system in which a faulty control is prevented which otherwise might be caused by an abnormal correction factor.

The feature of the present invention lies in that, in the case where the difference between the value of the correction factor (transient compensation value) read out of the RAM and a set value corresponding to the correction factor (fixed compensation value) held in a ROM is not more than a predetermined amount, the value read out of the RAM is used as a correct value for control. However, if the difference is more than the predetermined amount, the value in the ORM is used for control and replaces the value in the RAM.

DESCRIPTION OF THE PREFERRED EMBODIMENTS

Figure 2:
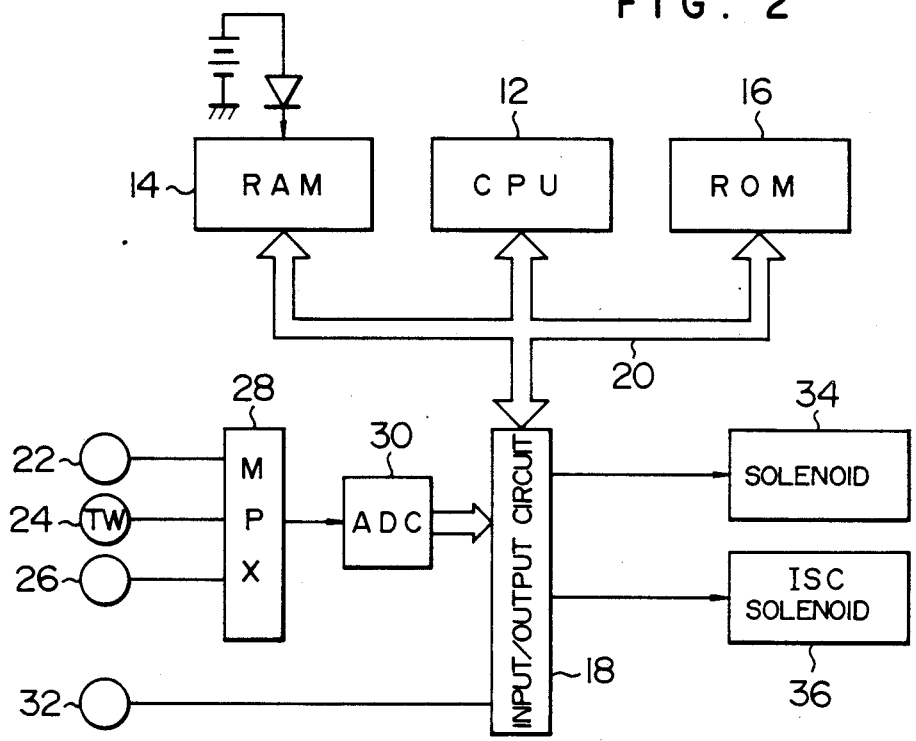
FIG. 2 is a system block diagram.

An embodiment of the present invention is shown in the block diagram of FIG. 2. A central processor unit (CPU) 12, a random access memory (RAM) 14 constantly supplied with a battery voltage, and a read-only memory (ROM) 16 are connected to an input-output circuit 18 through a bus line 20. The input-output circuit 18 is supplied with one of the outputs from analog sensors 22, 24, 26 selected by a multiplexer 28 through an analog-digital converter (ADC) 30. Further, the input-output circuit 18 is connected to receive an output of a rotational angle sensor 32 which generates a pulse with the rotation of the crankshaft, and the engine speed is measured by this pulse. A solenoid 34 of an electronically-controlled carburetor, on the other hand, is controlled according to the duty factor of the pulse determined by the above-mentioned inputs. With the increase in the duty factor of the pulse, the solenoid 34 increases the amount of fuel supplied to the engine. By increasing the duty factor of the pulse to the ISC (Idle Speed Control) solenoid 36, on the other hand, the rotational speed of the engine in the idle state may be increased.

Figure 3:
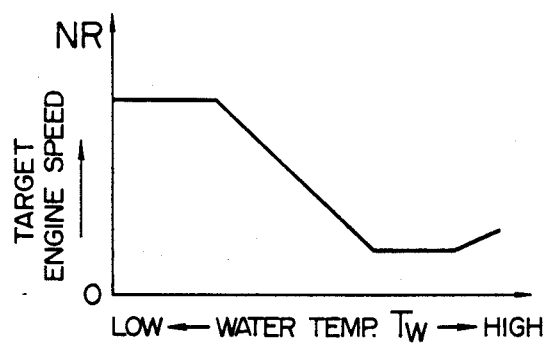
FIG. 3 is a characteristic diagram showing an engine speed target against water temperature.
Figure 4:
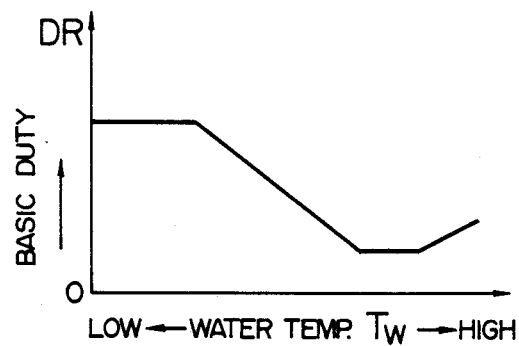
FIG. 4 is a characteristic diagram of duty factor of the output pulse against water temperature.
Figure 5:
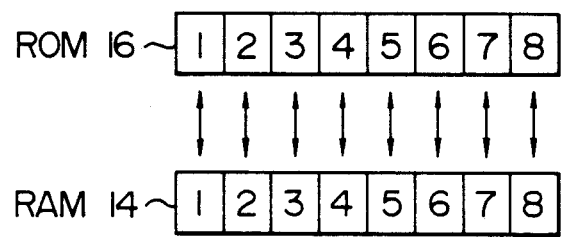
FIG. 5 is a block diagram showing a correspondence between the segments of ROM and RAM.

The present invention, which is applicable to various controls, will be explained below with reference to the idle speed control of the engine. FIG. 3 is a characteristic diagram showing an engine target speed NR with the engine cooling water temperature as a parameter. In order to obtain this characteristic, the pulse applied to the ISC solenoid 36 is controlled in the manner of the basic duty factor shown in FIG. 4. Partly due to characteristic dispersions of engines and due to secular change, a given engine does not always have the same characteristic as shown in FIG. 3 even when it is controlled in the manner shown in FIG. 4. For each engine, therefore, the actual control duty factor is required to be corrected on the basis of the basic duty factor DR. For this purpose, as shown in FIG. 5, the basic duty factor DR is divided into eight classes in accordance with water temperature and is stored in the ROM 16. In correspondence with this, eight divided areas are provided in the RAM 14 for storing the corrected control duty factors corresponding to the basic duty factor DR respectively. Under normal conditions, the values stored in the RAM 14 are used for engine speed control. The values stored in the RAM 14, however, may become abnormal for some reason or other. If a value stored in the RAM 14 is abnormal, a corresponding value in the ROM 16 is written into the RAM 14 to initiate a correction of the control duty factor.

Figure 1:
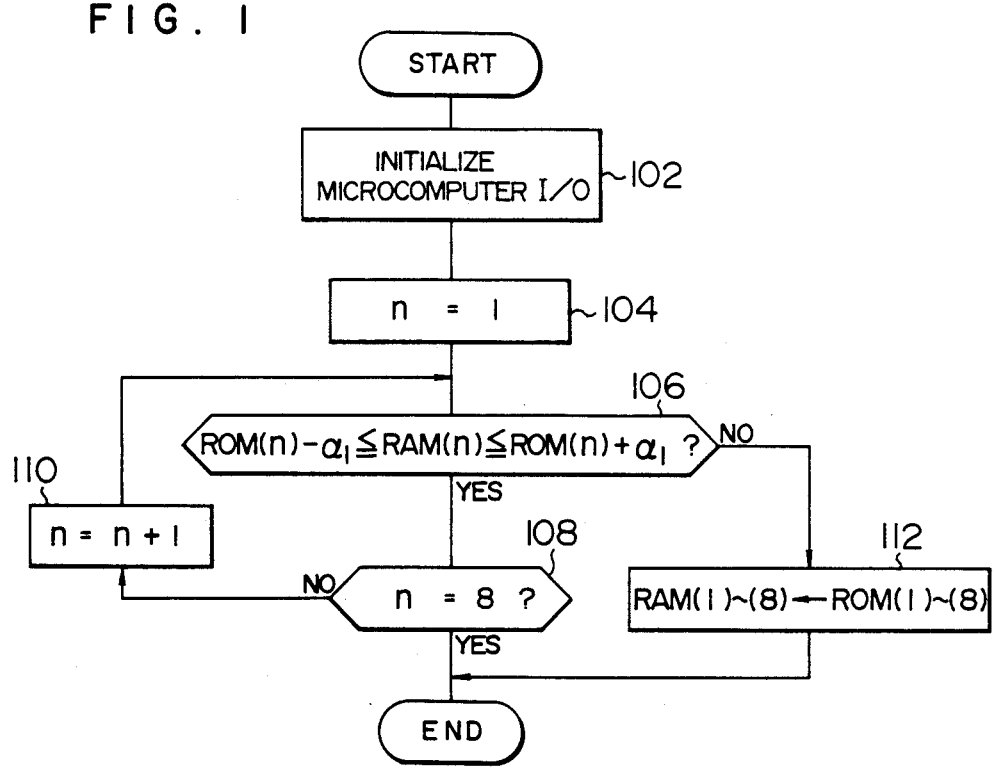
FIG. 1 is a flow chart showing an embodiment of the present invention, wherein a correction factor is rewritten.

A flowchart for correcting the control duty factor based on the concept mentioned above is shown in FIG. 1. When power is supplied to the CPU 12, the operation is executed according to the flowchart of FIG. 1. The initialization of the input-output circuit 18 is conducted at step 102, followed by step 104 for selecting the class "1" of the RAM 14. The stored value of class "1" is read from RAM (1), and the step 106 decides whether the value of RAM (1) is located in the region between a value smaller by $\alpha 1$ than the ROM (1) value in ROM 16 class "1" and a value larger by $\alpha 1$ than the ROM (1) value. If the stored value read from RAM (1) is located in this range, this particular value is determined to be normal. Step 108 decides whether the decisions on all the RAM classes have been completed, and if they are not completed, the next step 110 advances to the next class to make a similar decision. If all the values of classes of the RAM 14 are located within a predetermined range of the respective classes of the ROM 16, the values stored in the RAM are considered reliable and the process of FIG. 1 is completed. If step 106 decides that the values held in the RAM 14 are located outside of the range based on the values of the ROM 16, by contrast, the other classes are also considered unreliable so that step 112 replaces all the values stored in the RAM 14 with the values of the basic duty factor of the ROM 16 thereby to start the learning control mentioned below.

Figure 6:
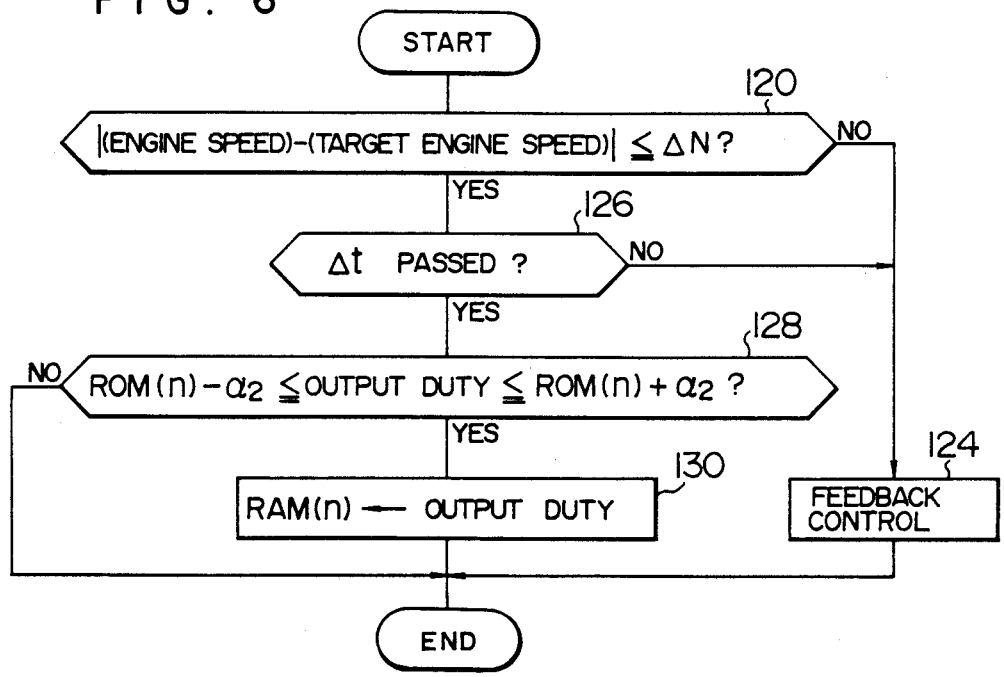
FIG. 6 is a flowchart showing a learning control.

FIG. 6 is a flowchart showing the learning control. Step 120 reads out a target engine speed NR from the table of the ROM 16, on the basis of the output of the water temperature sensor 24, determines the difference thereof from the actual engine speed N, and decides whether this difference is not more than $\Delta N$. If this value is more than $\Delta N$, step 124 effects a feedback control for changing the pulse duty factor to the ISC solenoid valve 36 by a predetermined value. This feedback control is a closed loop control for maintaining the idle speed in a predetermined value. The operation flow of FIG. 6 is executed at regular intervals of time. With the lapse of a predetermined time length, therefore, the step 120 is executed again. If step 120 decides that the difference between the actual measurement and the target value is not more than $\Delta N$, step 126 decides whether a predetermined time $\Delta t$ has passed by counting the number of executions of the operation flow of FIG. 6. If a predetermined time has passed, it is decided whether the duty factor of the output pulse to the ISC solenoid 36 is within a predetermined range, that is, the value stored in the ROM 16 $\pm \alpha 2$, and if it is within that range, the duty factor involved is stored in the RAM 14 by step 130. The reading of the ROM 16 or writing into the RAM 14 at steps 128 and 130 are effected for each class determined by the output of the water temperature sensor. If the conditions fail to be met in step 126, step 124 effects feedback control again. If the conditions fail to be met at step 124, on the other hand, the writing of the RAM 14 is not effected.

Figure 7:
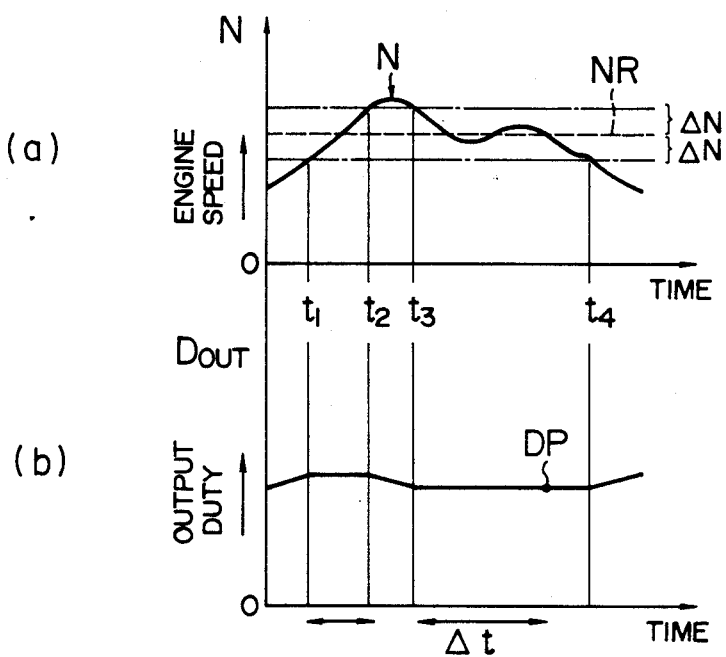
FIG. 7 is a diagram for explaining the operation of FIG. 6.

The operation of the flow chart in FIG. 6 is shown in FIG. 7. When the actual measurement N enters the range of variation $\Delta N$ of the target engine speed NR, the duration thereof is measured. During the period from the timing t1 to t2, the lapse of time has not reached $\Delta t$, and therefore the writing into the RAM 14 is not effected. On the other hand, the time length from the timing t3 to t4 is so long that the value DP of the output duty factor DOUT to the ISC solenoid 36 with the lapse of the time $\Delta t$ from the timing t3 is stored in the class of the RAM 14 based on the water temperature as a corrected control duty factor.

Figure 8:
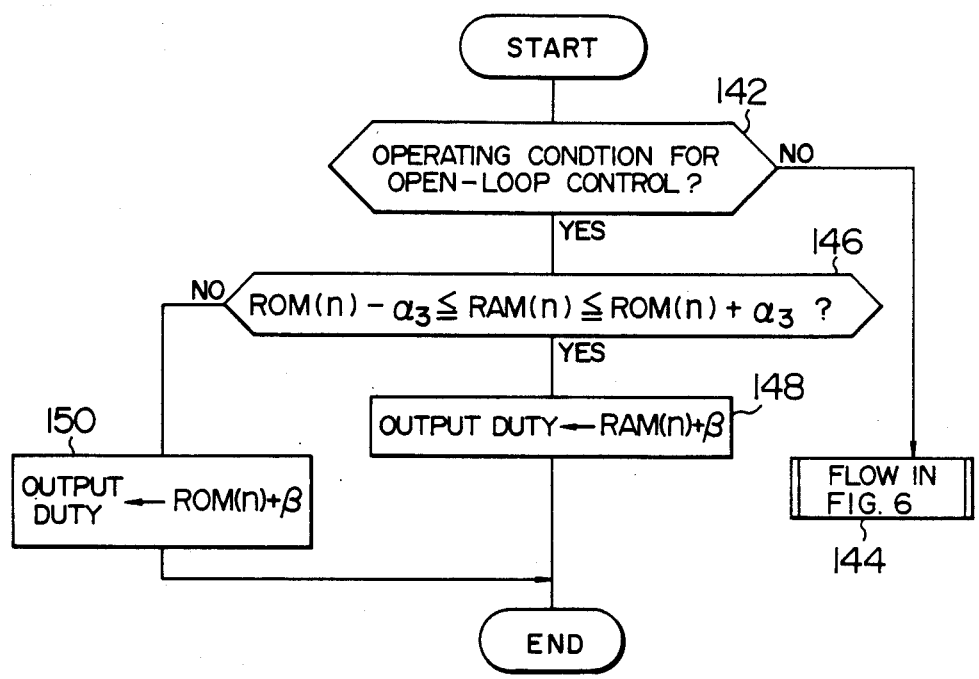
FIG. 8 is a flowchart showing the speed control of the engine in idle state.

FIG. 8 is a flowchart in an engine operation such as a warming up of the engine wherein the value of the RAM 14 is used. The open loop control is a mode in which the idling operation is maintained until the water temperature reaches in a predetermined temperature. The decision as to whether the control is feed back or open loop is made according to the conditions of the idling operation and the water temperature. Step 142 decides whether a feedback or open-loop control is involved. If step 142 decides according to the operating conditions that an operation mode for feedback control is involved, then the process proceeds to the flow of FIG. 6 shown in step 144. If an open-loop control is involved, on the other hand, step 146 reads the duty factor from the class of the RAM 14 determined by the water temperature, and decides whether the particular value is located in a predetermined range of the corresponding class of the ROM. If it is within the predetermined range of the corresponding class of the ROM, step 148 adds the compensation value $\beta$ depending on the other operating conditions to the value stored in the RAM and applies it to the input-output circuit 18. The pulse of a duty factor based on this output is applied to the ISC solenoid 36. As a result, the amount of air supplied to the engine in the idle state is controlled. If the conditions fail to be met at step 146, by contrast, step 150 adds the compensation value $\beta$ to the value stored in the ROM and applies it to the input-output circuit 150. In this manner, a reliable control is realized.

Apart from the foregoing description concerning the control of idle engine speed, the present invention may be applicable with equal effect to other engine control parameters such as fuel injection control, ignition timing control and EGR control.

We claim:

1. A method for controlling an engine having control means including a processor unit with a computation function for providing transient control values based on measured engine parameters, a read-only memory for storing fixed control values, a random-access memory for storing transient control values provided by said processor unit, and control input adjusting means for regulating an engine control input in accordance with control values output from said random-access memory, said method comprising the steps of:
   comparing the transient control values in said random-access memory and corresponding fixed control values in said read-only memory to detect a difference therebetween;
   reading out the control values in said random-access memory for regulating said engine control input if said difference is within a predetermined range; and
   replacing any transient control value in said random access memory by a fixed control value in said read-only memory if said difference therebetween is outside said predetermined range, and then reading out the control values from said random access memory for regulating said engine control input.

2. An engine control method according to claim 1, in which, in the case where the difference between any one transient control value in said random-access memory and a corresponding fixed control value in said read-only memory is outside of said predetermined range, all fixed control values in said read-only memory are written into said random-access memory to replace all transient control values previously stored therein.

3. A method for controlling an operation of an internal combustion engine using an operation control signal, comprising the steps of:
   (a) storing, in a read-only memory, fixed control values for use in generating said operation control signal;
   (b) storing transient control values based on at least one engine operating condition in a random access memory;
   (c) detecting a value related to the engine operation controlled by said operation control signal;
   (d) comparing said detected engine operation value to a target value to produce a difference value;
   (e) when said difference value is outside of a first predetermined range, effecting feedback control on said operation control signal to cause said difference value to come inside said first predetermined range;
   (f) when said difference value has come within said first predetermined range in step (e), reading out of said read-only memory a fixed control value related to said detected engine operation value and detecting whether a transient control value corresponding to the current operation control signal is within a second predetermined range of the fixed compensation value read out of said read-only memory;
(g) if the transient control value corresponding to the current operation control signal is within said second predetermined range of the fixed compensation value, storing that transient control value in said random-access memory; and
(h) generating said operation control signal on the basis of transient control values stored in said random-access memory.

4. An engine control method according to claim 3, wherein the step (e) includes detecting when said difference value enters said first predetermined range, and effecting feedback control on said operation control signal while inhibiting steps (f) through (h) if said difference value has not remained within said first predetermined range for a given time.

5. An engine control method according to claim 3, wherein said engine control signal controls engine speed and said detected value related to the engine operation is a measure of engine speed.

* * * * *